United States Patent
Niwa et al.

(10) Patent No.: US 7,486,455 B2
(45) Date of Patent: Feb. 3, 2009

(54) COLOR WHEEL WITH SEGMENT FIXING MECHANISMS, AND MANUFACTURING METHOD OF SAME

(75) Inventors: Shinichi Niwa, Iwata-gun (JP); Toshiaki Asakawa, Iwata-gun (JP); Shigeyuki Adachi, Iwata-gun (JP); Kuniyuki Takao, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/960,010

(22) Filed: Oct. 8, 2004

(65) Prior Publication Data
US 2006/0028746 A1 Feb. 9, 2006

(30) Foreign Application Priority Data
Aug. 6, 2004 (JP) ............... 2004-230995

(51) Int. Cl.
*G02B 5/22* (2006.01)
(52) U.S. Cl. ........................ 359/892; 359/885
(58) Field of Classification Search ............ 359/892; 353/84
See application file for complete search history.

(56) References Cited

U.S. PATENT DOCUMENTS

| | | | |
|---|---|---|---|
| 4,800,474 A | 1/1989 | Bornhorst | |
| 5,257,332 A | 10/1993 | Pimpinella | |
| 5,868,482 A | 2/1999 | Edlinger et al. | |
| 6,011,662 A | 1/2000 | Evans | |
| 6,024,453 A | 2/2000 | Edlinger et al. | |
| 6,088,175 A * | 7/2000 | Iguchi | 359/892 |
| 6,574,046 B1 | 6/2003 | Shioya | |
| 6,702,446 B2 | 3/2004 | De Vaan et al. | |
| 6,715,887 B2 | 4/2004 | Chang | |
| 6,813,087 B2 | 11/2004 | Davis | |
| 6,896,376 B2 * | 5/2005 | Chin et al. | 353/84 |
| 6,914,734 B1 * | 7/2005 | Kao et al. | 359/892 |
| 7,063,425 B2 * | 6/2006 | Wu | 353/84 |
| 2002/0005914 A1 | 1/2002 | Tew | |
| 2002/0105729 A1 | 8/2002 | Richards et al. | |
| 2003/0142241 A1 | 7/2003 | Allen et al. | |
| 2004/0095767 A1 | 5/2004 | Ohmae et al. | |
| 2005/0018145 A1 | 1/2005 | Kwon et al. | |

FOREIGN PATENT DOCUMENTS

| | | |
|---|---|---|
| JP | A 3-122903 | 5/1991 |
| JP | A 5-90391 | 4/1993 |
| JP | A 6-347639 | 12/1994 |
| JP | A 10-48542 | 2/1998 |
| JP | A 11-115711 | 4/1999 |
| JP | A 11-222664 | 8/1999 |
| JP | A 2000-239830 | 9/2000 |
| JP | A 2001-73136 | 3/2001 |
| JP | A 2003-50309 | 2/2003 |
| JP | A 2003-57424 | 2/2003 |
| JP | A 2004-101827 | 4/2004 |
| WO | WO 94/25796 | 11/1994 |

* cited by examiner

*Primary Examiner*—Audrey Y Chang
(74) *Attorney, Agent, or Firm*—Oliff & Berridge, PLC (57) ABSTRACT

A color wheel comprises sectorial color filter segments and a support member. Protrusions are disposed at the support member and engaged with either through-holes or cavities as segment fixing mechanisms formed at the color filter segments, whereby the color filter segments are fixedly positioned with respect to the support member in the radial direction. Consequently, the color filter segments can be surely prevented from getting scattered off when the color wheel spins at high speed.

7 Claims, 6 Drawing Sheets

COLOR WHEEL WITH SEGMENT FIXING MECHANISMS, AND MANUFACTURING METHOD OF SAME

BACKGROUND OF THE INVENTION

1. Field of the Invention

The present invention relates to a color wheel suitable for use as a filter element of a time-share light dispersing device, and more specifically to a color wheel of segment type, and to a manufacturing method of a color wheel of segment type.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into R (red), G (green), and B (blue) lights; and a three-panel method, in which three light valve elements dedicated to R, G and B lights, respectively, are used to produce R, G and B images in parallel, and then the three images thus produced are composed. Recently, as a light valve element capable of fast switching, such as a ferroelectric liquid crystal display element or a digital micro-mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time-series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner.

Figure 6A:
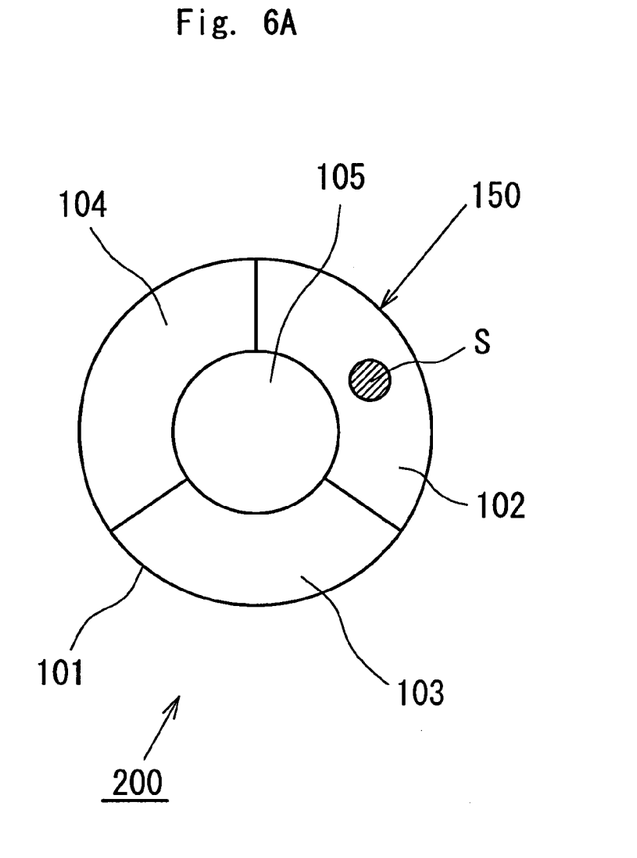
FIGS. 6A and 6B are respectively top plan and side views of a conventional color wheel assembly using a segment type color wheel.
Figure 6B:
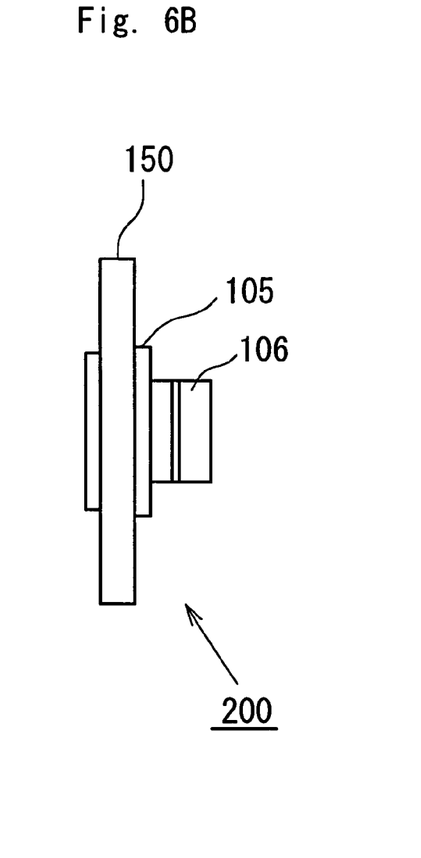

FIGS. 6A and 6B are respectively top plan and side views of a conventional and typical color wheel assembly 200 as a time-share light dispersing device including such a color wheel. Referring to FIG. 6B, the color wheel assembly 200 comprises a color wheel 150, and a driving motor 106 including a motor hub 105. The color wheel 100 is a tricolor color wheel composed of a disk-like substrate 101 which is made of a light-transmitting material, for example, optical glass, and three pie-shaped (sectorial) filters 102, 103 and 104 which are formed on a surface of the substrate 101, and which transmit exclusively, for example, R, G and B lights, respectively. The color wheel 150 thus structured is fixedly attached to the motor hub 105 coaxially therewith. The color wheel assembly 200 operates such that the color wheel 150 is spun by the driving motor 106 so that white light S impinges sequentially on the filters (R, G and B) 102, 103 and 104 whereby the white light S is sequentially dispersed into R, G and B lights.

There are two types of color wheel structures: a monolithic type structured such that respective color filters are formed on a disk-like substrate; and a segment type structured such that respective color filter segments separately prepared in a sectorial shape are fixedly attached to one another so as to form a disk.

Figure 7:
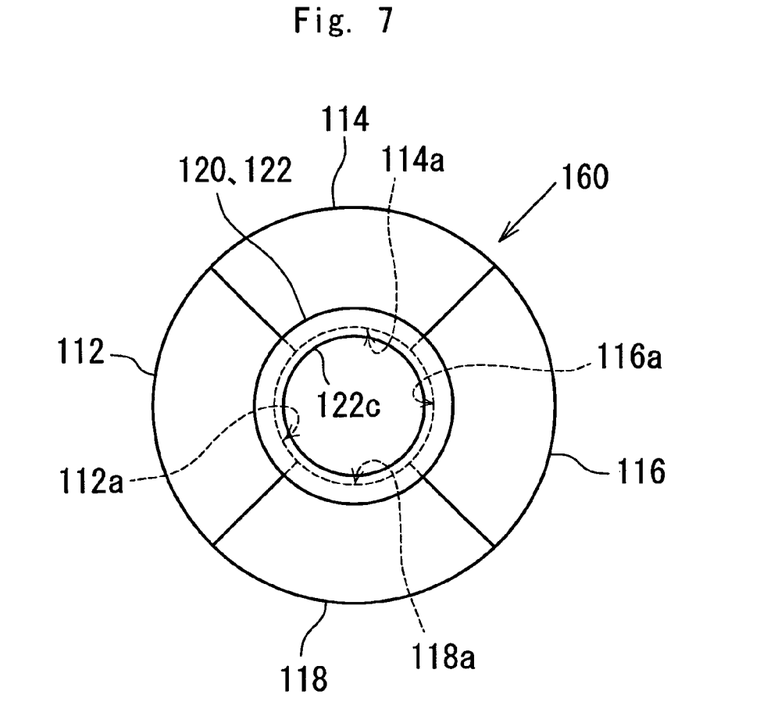
FIG. 7 is a top plan view of a conventional segment type color wheel.
Figure 8:
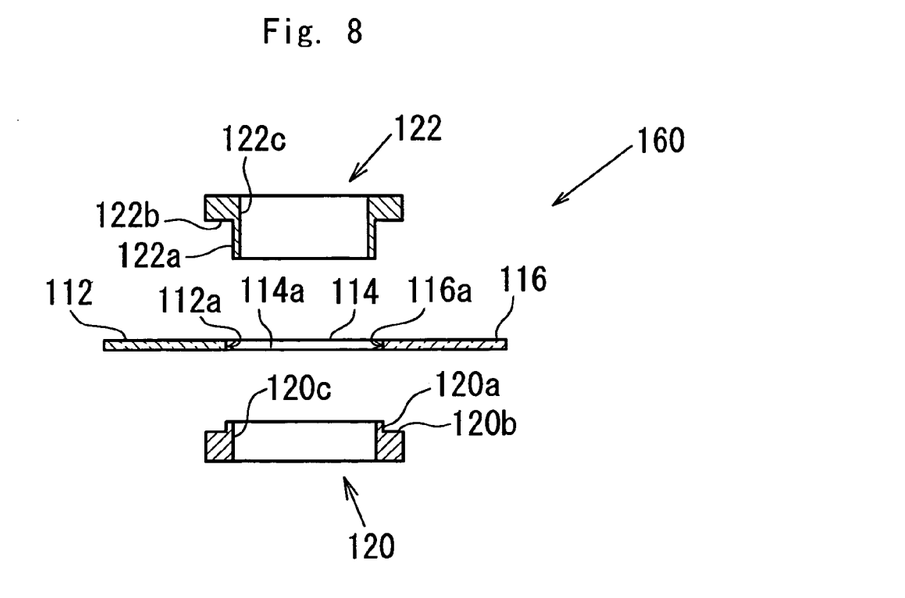
FIG. 8 is an exploded sectional view of the color wheel of FIG. 7.

FIGS. 7 and 8 shows respectively top plan and exploded side sectional view of a segment type color wheel 160 comprising a plurality (four in FIG. 7) of sectorial color filter segments 112, 114, 116 and 118 which are separately prepared and are fixed in position by means of a support member 120 so as to form a disk. In the color wheel 160 of FIGS. 7 and 8, a clamp member 122 is additionally employed in order to securely fix the color filter segments 112, 114, 116 and 118.

Specifically, as shown in FIG. 8, inner circumferences 112a, 114a, 116a and 118a of the color filter segments 112, 114, 116 and 118 are fitted to an outer circumference of a smaller cylinder portion 120a of the support member 120 whereby the color filter segments 112, 114, 116 and 118 are duly set in position in the radial direction of the color wheel 160, and surfaces thereof toward the inner circumferences 112a, 114a, 116a and 118a are fitted to an annular seat portion 120b of the support member 120 whereby the color filter segments 112, 114, 116 and 118 are duly set in position in the thickness direction of the color wheel 160. Then, a smaller cylinder portion 122a of the clamp member 122 is engagingly inserted into a hollow 120c of the support member 120 so that an annular seat portion 122b of the clamp member 122 and the aforementioned annular seat portion 120b of the support member 120 sandwich and clamp the inner circumferential portions of the color filter segments 112, 114, 116 and 118. And, when the support member 120 and the clamp member 122 are bonded or screwed together, the color filter segments 112, 114, 116 and 118 are fixed in position. The color wheel 160 thus structured is fixedly attached to a motor (such as the driving motor 106 as shown FIG. 6B) via a hub (such as the hub 105 as shown in FIGS. 6A and 6B) such that the hub is inserted in the hollow 122c of the clamp member 122 constituting the color wheel 160 (refer to, for example, Japanese Patent Applications Laid-Open Nos. 2004-101827 ([0010], and FIG. 6) and H10-48542 (claim 1, and FIG. 2).

In the monolithic type structure, it does not happen that the color filters are scattered off when the color wheel spins at high speed. On the other hand, in the segment type structure, as described above, the color filter segments 112, 114, 116 and 118 separately prepared are fixed, for example, adhesively to the support member 120, so all the components must be securely fixed to one another in order to prevent the color filter segments from getting scattered off when the color wheel 160 spins at high speed. Consequently, the number of man-hour for a bonding process and an inspection process is increased in order to fully ensure the bonding strength, which results in an increased cost.

SUMMARY OF THE INVENTION

The present invention has been made in the light of the disadvantage described above, and it is an object of the present invention to securely fix color filter segments in position with respect to a support member in order to surely prevent the color filter segments from getting scattered off when a color wheel spins at high speed so that enhanced reliability with a segment type color wheel can be achieved at a reduced cost.

In order to achieve the object, according to a first aspect of the present invention, a color wheel comprises: a plurality of sectorial color filter segments, each of which has at least one segment fixing mechanism constituted by either a through-hole or a cavity; and a support member which has a plurality of protrusions disposed at an outer peripheral portion thereof. The protrusions of the support member are fitted in respective segment fixing mechanisms of the color filter segments, whereby the color filter segments are fixedly set to the support member in a disk-like arrangement. Since the protrusions of the support member are engaged with the through-holes or cavities as the segment fixing mechanisms formed at the color filter segments, the color filter segments are duly and fixedly positioned with respect to the support member in the radial direction. Consequently, the color filter segments can be surely prevented from getting scattered off due to centrifugal force when the color wheel spins at high speed. Further, the support member and the color filter segments can be securely fixed together without using any additional independent fixing components.

In the first aspect of the present invention, the protrusions may be constituted by pins or balls that are either press-fitted into respective protrusion fitting mechanisms each constituted by either a through-hole or a cavity formed at the outer peripheral portion of the support member, or loose-fitted therein to be adhesively fixed. In any case of the protrusions constituted as described above, since the protrusions of the support member are engaged with the through-holes or cavities as the segment fixing mechanisms formed at the color filter segments, the color filter segments are duly and fixedly positioned with respect to the support member in the radial direction. Consequently, the color filter segments can be surely prevented from getting scattered off due to centrifugal force when the color wheel spins at high speed.

In the first aspect of the present invention, the segment fixing mechanism of the color filter segment and/or the protrusion fitting mechanism of the support member may be constituted by a through-hole rather than a cavity, and the protrusions may be either press-fitted or loose-fitted through the protrusion fitting mechanisms and the segment fixing mechanisms after the color filter segments are set in position with respect to the support member such that the segment fixing mechanisms coincide with either the protrusion fitting mechanisms. Here, the color filter segments are duly and fixedly positioned with respect to the support member in the radial direction at the final part of the color wheel assembling work. Thus, the color filter segments can be surely prevented from getting scattered off due to centrifugal force when the color wheel spins at high speed.

In the first aspect of the present invention, the support member may be formed by either casting or pressing so as to integrally include the protrusions at the outer peripheral portion. Consequently, the support member can be formed integrally with the protrusions resulting in a reduced number of components and also a reduced number of processes.

In the first aspect of the present invention, the cavities as the protrusion fitting mechanisms formed at the outer peripheral portion of the support member may be constituted by either an uninterrupted or interrupted annular groove. In this structure, since the balls as the protrusions can rotatably move along the annular groove even after the color filter segments are set to the support member, the color filter segments can be rotated with respect to the support member. Consequently, adhesive applied between the color filter segments and the support member can be preferably spread therebetween resulting in enhanced reliability in bonding strength.

Further, in the first aspect of the present invention: the protrusions may be either press-fitted into the segment fixing mechanisms of the color filter segments, or loose-fitted therein to be adhesively fixed; one surface of the support member may be in contact with a motor hub; one surfaces of the color filter segments may be in contact with a motor hub; and the color wheel may further comprise a clamp member to fix together the color filter segments and the support member.

According to a second aspect of the present invention, there is provided a manufacturing method of a color wheel comprising a plurality of sectorial color filter segments, and a support member. The manufacturing method comprises the steps of: providing protrusions at an outer peripheral portion of the support member; forming, at each of the color filter segments, at least one segment fixing mechanism which is constituted by either a through-hole or a cavity; and fitting the protrusions in respective segment fixing mechanisms thereby fixedly setting the color filter segments to the support member in a disk-like arrangement. Since the protrusions of the support member are engaged with the through-holes or cavities as the segment fixing mechanisms formed at the color filter segments, the color filter segments are duly and fixedly positioned with respect to the support member in the radial direction. Consequently, the color filter segments can be surely prevented from getting scattered off due to centrifugal force when the color wheel spins at high speed. Further, the support member and the color filter segments can be securely fixed together without using any additional independent fixing components.

In the second aspect of the present invention, the protrusions may be provided such that pins or balls are either press-fitted into protrusion fitting mechanisms each constituted by either a through-hole or a cavity formed at the outer peripheral portion of the support member, or loose-fitted therein to be adhesively fixed. In any case of the protrusions provided as described above, since the protrusions of the support member are engaged with the segment fixing mechanisms of the color filter segments, the color filter segments are duly and fixedly positioned with respect to the support member in the radial direction. Consequently, the color filter segments can be surely prevented from getting scattered due to centrifugal force when the color wheel spins at high speed.

In the second aspect of the present invention, the segment fixing mechanism of the color filter segment and/or the protrusion fitting mechanisms of the support member may be constituted by a through-hole rather than a cavity, and the protrusions may be fitted through the protrusion fitting mechanisms and the segment fixing mechanisms after the color filter segments are set in position with respect to the support member such that the segment fixing mechanisms coincide with the protrusion fitting mechanisms. Here, the color filter segments are duly and fixedly positioned with respect to the support member in the radial direction at the final part of the color wheel assembling work. Thus, the color filter segments can be surely prevented from getting scattered off due to centrifugal force when the color wheel spins at high speed.

In the second aspect of the present invention, the support member may be formed by either casting or pressing so as to integrally include the protrusions at the outer peripheral portion. Consequently, the support member can be integrally formed with the protrusions resulting in a reduced number of components and also a reduced number of processes.

In the second aspect of the present invention, the cavities as the protrusion fitting mechanisms formed at the outer peripheral portion of the support member may be constituted by either an uninterrupted or interrupted annular groove. In this structure, since the balls as the protrusions can rotatably move along the annular groove even after the color filter segments are set to the support member, the color filter segments can be rotated with respect to the support member. Consequently, adhesive applied between the color filter segments and the support member can be preferably spread therebetween resulting in enhanced reliability in bonding strength.

Further, in the second aspect of the present invention; the protrusions may be either press-fitted into the segment fixing mechanisms of the color filter segments, or loose-fitted therein to be adhesively fixed; one surface of the support member may be in contact with a motor hub; one surfaces of the color filter segments may be in contact with a motor hub; and the color filter segments and the support member may be fixed together by means of a clamp member.

DETAILED DESCRIPTION OF THE PREFERRED EMBODIMENTS

Preferred embodiments of the present invention will hereinafter be described with reference to the drawings. In the drawings of the respective embodiments, the elements corresponding to the elements of the prior art have the same reference numbers and will not be described in detail.

Figure 1A:
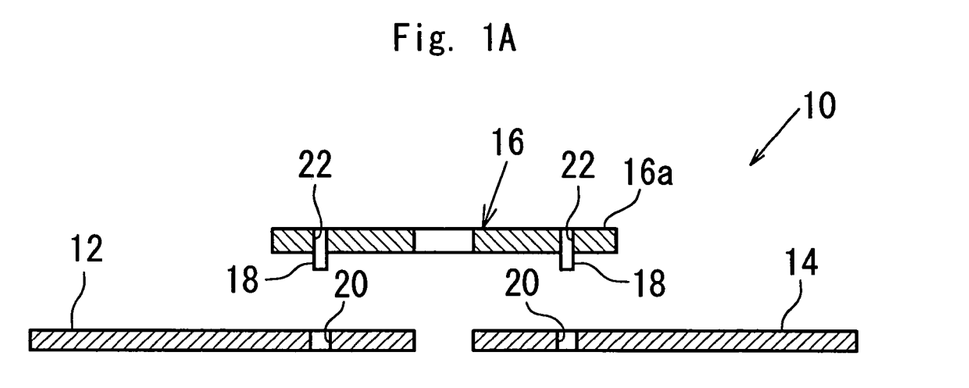
FIGS. 1A and 1B are respectively exploded and assembled sectional view of a color wheel according to a first embodiment of the present invention.
Figure 1B:
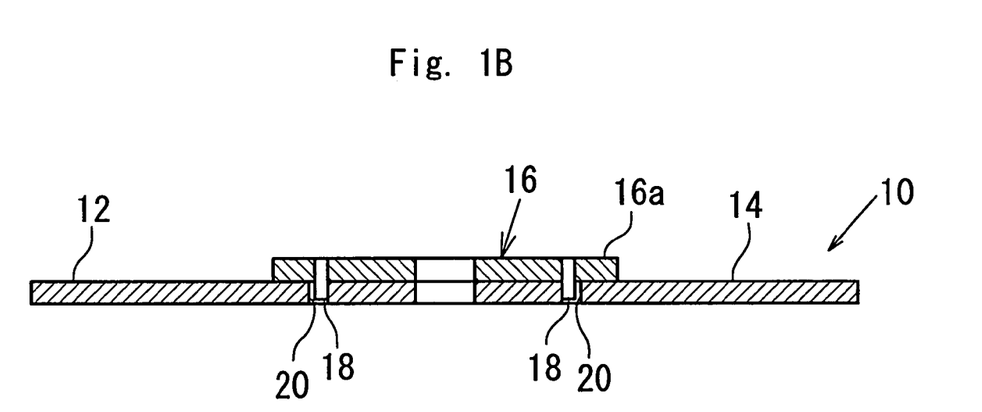

Referring to FIGS. 1A and 1B, a color wheel 10 of segment type structure according to a first embodiment of the present invention comprises: a plurality of sectorial color filter segments (hereinafter referred to simply as "segments" as appropriate) 12 and 14; and a support member 16 (shaped like a disk) to hold the plurality of segments 12 and 14 in a disk-like arrangement. The support member 16 has a plurality of pins 18 as protrusions disposed at an outer peripheral portion 16a thereof, and the segments 12 and 14 each have a through-hole or cavity 20 (through-hole in the figures) as a segment fixing mechanism for receiving each of the pins 18 of the support member 16 therein. The segments 12 and 14 are generally formed of glass, and the through-holes 20 are formed by normal machining, but may alternatively be formed by ultrasonic machining, blasting, laser machining, or the like.

FIGS. 1A and 1B indicate only two segments 12 and 14 due to the color wheel 10 shown in cross section, but actually a color wheel includes at least three segments (refer to FIGS. 6A and 7) for fulfilling its light dispersing function. Also, the pins 18 of the support member 16 are provided at least in a number corresponding to the number of the segments, and two or more pins may be provided for each segment as required.

The pins 18 are disposed at the support member 16 such that the pins 18 are press-fitted into through-holes or cavities 22 (through-holes in the figures) as protrusion fitting mechanisms formed at the outer peripheral portion 16a of the support member 16, or alternatively such that the pins 18 are loose-fitted in the through-holes 22 and adhesively fixed therein.

The pins 18 do not have to be pre-fixed to the support member 16 at an early stage of the assembling process of the color wheel 10 as described above, but may be fixed thereto after the segments 12 and 14 are set to the support member 16 with the through-holes 20 coinciding with the through-holes 22 for allowing the pins 18 to go through the through-holes 20 and 22. In any method of fixation, the segments 12 and 14 can be duly positioned with respect to the support member 16 in the radial direction when the pins 18 are engaged with the through-holes 20 of the segments 12 and 14. In this connection, the pins 18 may be fixed to the segments 12 and 14 by press-fitting into the through-holes 20, or bonding. The top end of the pin 18 is flat in FIGS. 1A and 1B, but may alternatively be chamfered or domed.

Figure 2A:
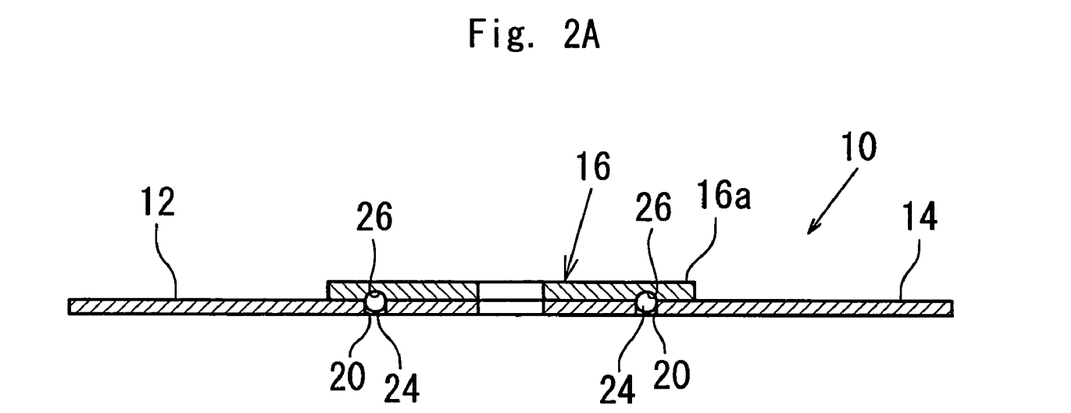
FIG. 2A is a schematic sectional view of a color wheel according to a second embodiment of the present invention.
Figure 2B:
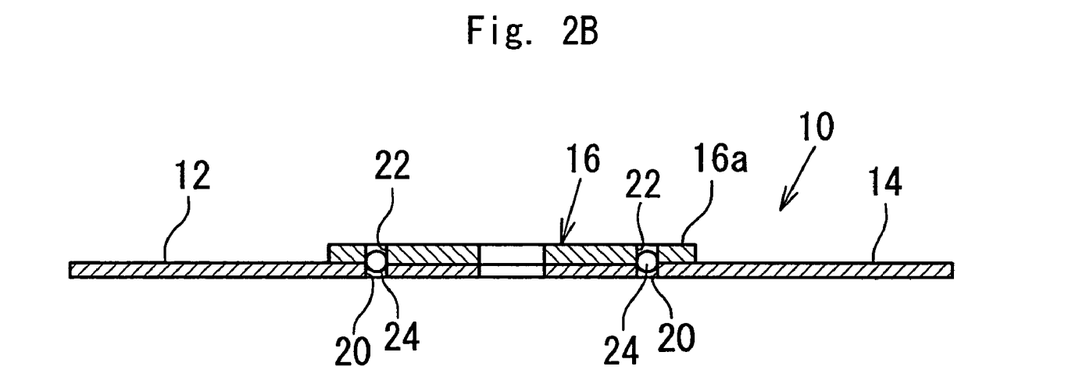
FIG. 2B is a schematic view of a color wheel according to a modified version of the second embodiment.

Two versions of a second embodiment of the present invention win be described with reference to FIGS. 2A and 2B. In FIGS. 2A and 2B, balls 24 (for example, bearing balls) as protrusions are used in place of the pins 18 in the first embodiment. In FIG. 2A, cavities 26 as protrusion fitting mechanisms with a concavely domed bottom are formed in an outer peripheral portion 16a of a support member 16, and the balls 24 are fitted in the cavities 26 in such a manner as to partly protrude from the support member 16, while in FIG. 2B, through-holes 22, in place of the cavities 26, are formed in the outer peripheral portion 16a of the support member 16 like in FIGS. 1A and 1B, and the balls 24 are fitted in the through-holes 22 in such a manner as to partly protrude from the outer peripheral portion 16a. The balls 24 may be fixed to the support member 16 by press-fitting into the cavities 26 or the through-holes 22, or bonding.

Figure 3:
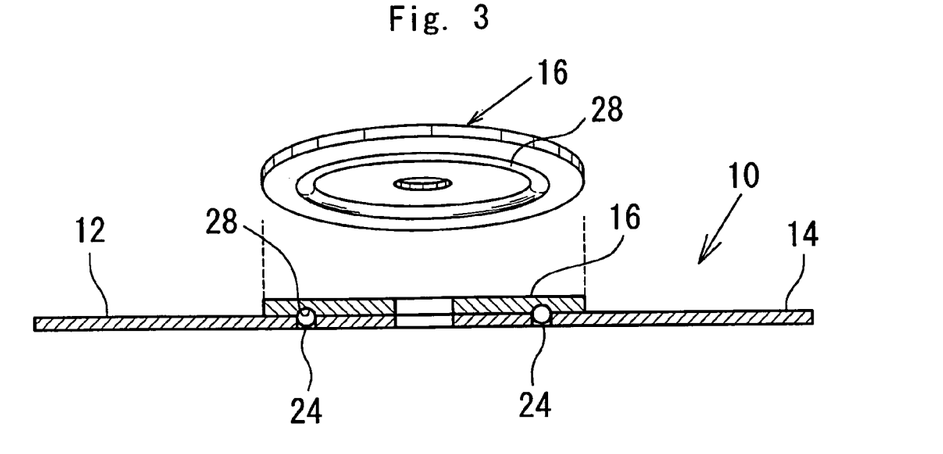
FIG. 3 is a schematic sectional view of a color wheel according to a third embodiment of the present invention, with a perspective view of a support member.

Referring now to FIG. 3 showing a third embodiment of the present invention, an annular groove 28 as protrusion fitting mechanism for receiving balls or pins (balls 24 in the figure) is formed on a surface of a support member 16 in an uninterrupted or regularly interrupted (uninterrupted in the figure) manner, and segments 12 and 14 are set closely to the surface of the support member 16 having the annular groove 28 so as to be fixedly positioned with respect to the support member 16 via the balls 24.

Though not shown, the support member 16 may be formed by casting or pressing to integrally include pin-like portions protruding from its outer peripheral portion 16a.

Figure 4A:
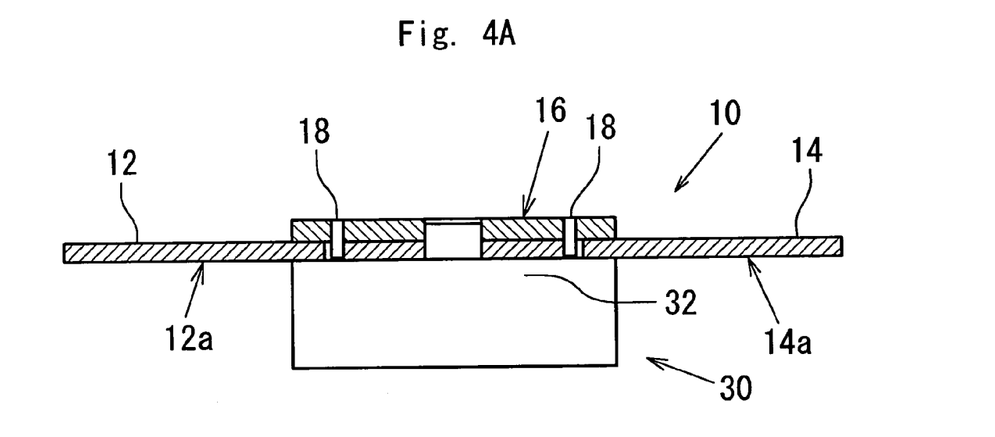
FIG. 4A is a schematic sectional view of the color wheel of FIG. 1B, fixedly attached to a motor hub of a driving motor with its segments disposed in contact with the motor hub.
Figure 4B:
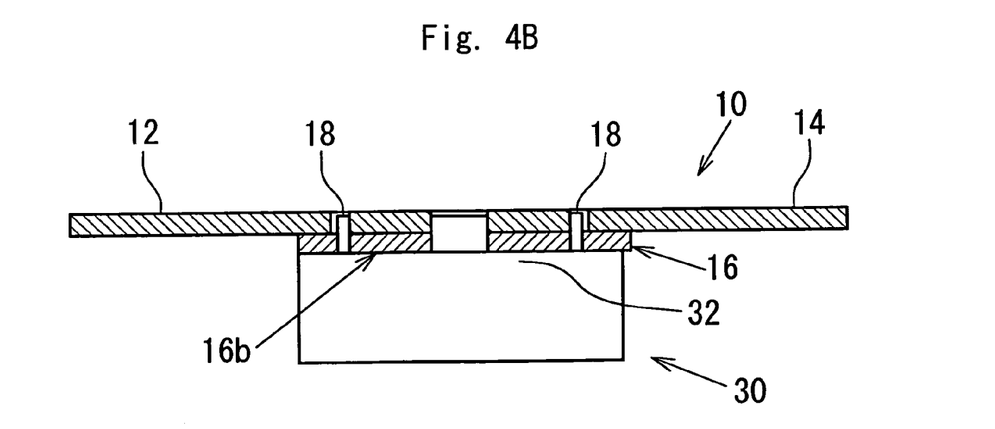
FIG. 4B is a schematic sectional view of the color wheel of FIG. 1B, fixedly attached to the motor hub of the driving motor with its support member disposed in contact with the motor hub.

FIGS. 4A and 4B both show that the color wheel 10 shown in FIG. 1B is fixedly attached to a motor hub 32 of a driving motor 30 in respective different manners. Specifically: referring to FIG. 4A, the segments 12 and 14 of the color wheel 10 are in contact with the motor hub 32 at their surfaces 12a and 14a, and referring to FIG. 4B, the support member 16 of the color wheel 10 is in contact with the motor hub 32 at its surface 16b. For example, if the color wheel 10 with the segments 12 and 14 which are not of the same thickness is attached to the motor hub 32 in the manner shown by FIG. 4A, adhesive applied between the color wheel 10 and the motor hub 32 is not uniform in thickness therefore possibly causing deteriorated reliability with bonding strength. In such a case, the manner shown by FIG. 4B is used, in which adhesive applied between the color wheel 10 and the motor hub 32 is uniform in thickness due to the flat plane defined by the surface 16b of the support member 16, whereby sufficient bonding strength is ensured. When the segments 12 and 14 are of the same thickness, adhesive applied between the color wheel 10 and the motor hub 32 is uniform in thickness in whichever attaching manner taken, thus ensuring sufficient bonding strength.

If a clamping means (refer to the clamp member 122 in FIGS. 7 and 8), which is formed in a plate-like configuration, and which functions, like, for example, a disk clamp conventionally used in a hard disk drive, to hold down the center part of the color wheel 10, is additionally used when the color wheel 10 is attached to the motor hub 32, then the segments 12 and 14 can be fixed to the support member 16 more reliably. The clamping means may be fixed to the motor hub 32 by, for example, screwing.

Figure 5A:
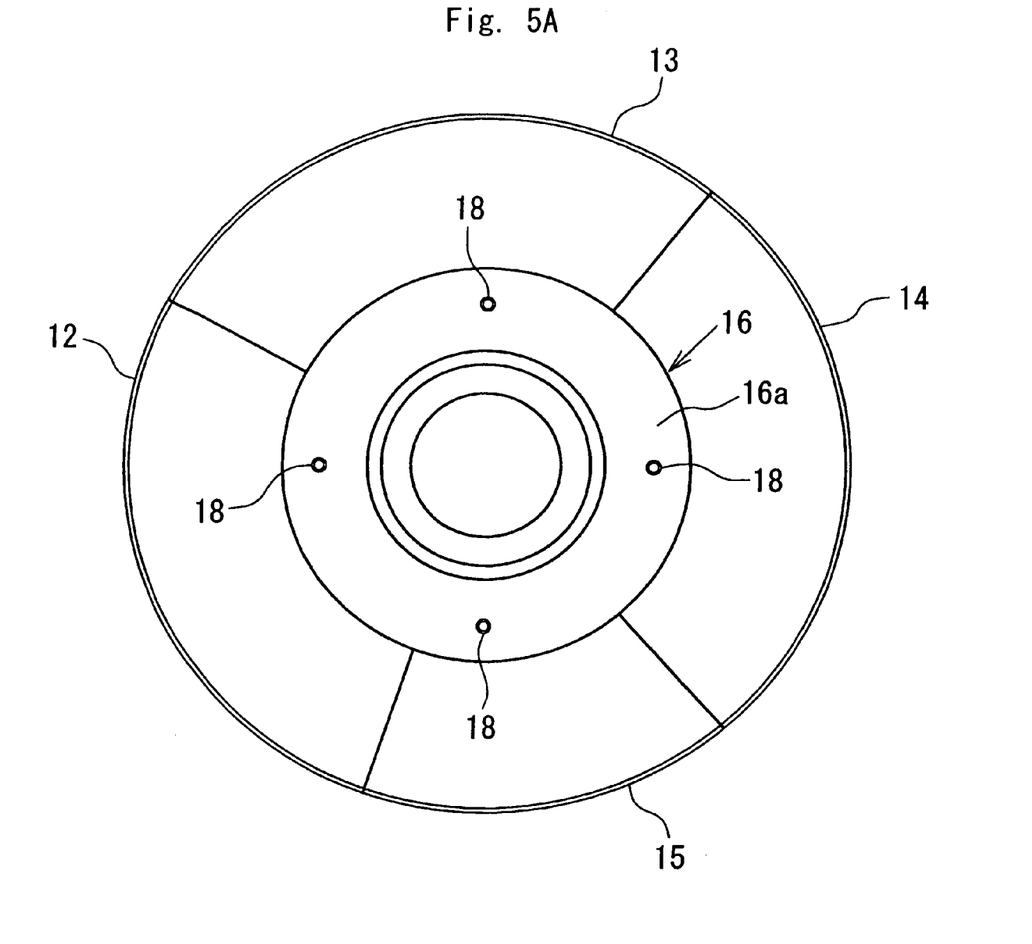
FIGS. 5A and 5B are respectively top plan and side (partly in cross section) views of a color wheel according to a fourth embodiment of the present invention, fixedly attached to a motor hub of a driving motor.
Figure 5B:
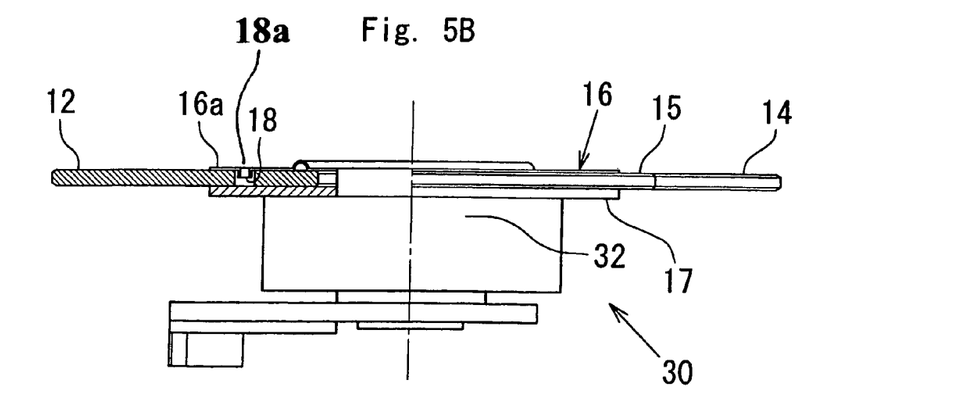

Referring to FIGS. 5A and 5B showing a fourth embodiment of the present invention, segments 12, 13, 14 and 15 are sandwiched between a support member 16 formed by pressing so as to integrally include pin-like portions 18 protruding from its outer peripheral portion 16a, and a disk-like base plate 17 attached to a motor hub 32 of a driving motor 30. In the embodiment, as an example, the support member 16 and the disk-like base plate 17 have an outer diameter unequal (larger in FIG. 5B) to that of the motor hub 32, and the pin-like portions 18 are positioned outside the motor hub 32.

The present invention achieves the following advantages.

The pins 18 or the balls 24, which may be either press-fitted into the through-holes (or cavities) 22 as the protrusion fitting mechanisms formed at the outer peripheral portion 16a of the support member 16, or loose-fitted therein to be adhesively fixed so as to constitute protrusions of the support member 16, are engaged with the through-holes (or cavities) 20 as the segment fixing mechanisms formed at the color filter segments 12 and 14, whereby the color filter segments 12 and 14 can be duly and fixedly positioned with respect to the support member 16 in the radial direction. Consequently, the color filter segments 12 and 14 can be surely prevented from getting scattered off due to centrifugal force when the color wheel 10 spins at high speed.

Further, the pins 18 or the balls 24 as the protrusions may be press-fitted, or loose-fitted (to be adhesively fixed) through the through-holes/cavities 22 of the support member 16 and the through-holes/cavities 20 of the color filter segments 12 and 14 after the color filter segments 12 and 14 are set in position with respect to the support member 16 such that the through-holes/cavities 20 coincide with the through-holes/cavities 22. Here, the color filter segments 12 and 14 are duly and fixedly positioned with respect to the support member 16 in the radial direction at the final part of the color wheel assembling work when the pins 18 or the balls are fitted through the through-holes/cavities 20 and 22. Thus, the color filter segments 12 and 14 can be surely prevented from getting scattered off due to centrifugal force when the color wheel 10 spins at high speed. Also, in this structure, since the color filter segments 12 and 14 can be rotated with respect to the support member 16 still after they (12/14 and 16) are set together but before the pins 18 or the balls 24 as protrusions are fitted through the through-holes/cavities 20 and 22, adhesive applied between the color filter segments 12 and 14 and the support member 16 can be preferably spread therebetween resulting in enhanced reliability in bonding strength.

The support member 16 can be formed by casting or pressing so as to integrally include protruding portions thereby reducing the number of components, and also the number of processes. In this connection, when the support member 16 is formed by pressing, cavities are consequently formed at the back of the protruding portions. The cavities thus formed can be utilized for adjusting balance of the color wheel 10 attached to the driving motor 30.

When the cavities 22 of the support member 16 are constituted by either an uninterrupted or interrupted annular groove, the balls 24 as protrusions can rotatably travel along the annular groove even after the color filter segments 12 and 14 are set to the support member 16. Since the color filter segments 12 and 14 can be rotated with respect to the support member 16 after they (12/14 and 16) are set together, adhesive applied between the color filter segments 12 and 14 and the support member 16 can be preferably spread therebetween resulting in enhanced reliability in bonding strength.

The pins 18 or the balls 24 may be press-fitted into the through-hoes/cavities 20 of the color filter segments 12 and 14, or loose-fitted therein to be adhesively fixed. Further, when the color wheel 10 is attached to the driving motor 10, the surface 16b of the support member 16 may be in contact with the motor hub 32, or the surfaces 12a and 14a of the color filter segments 12 and 14 may be in contact with the motor hub 32. In whichever structure, the advantages described above can be duly achieved. And in any cases described above, the color filter segments 12 and 14 can be securely fixed to the support member 16 and surely prevented from getting scattered off without using any additional fixing components, thus realizing enhanced reliability with a reduced cost. And, a clamp member may be additionally used for further secure fixation of the filter segments 12 and 14 to the support member 16.

While the present invention has been illustrated and explained with respect to specific embodiments thereof, it is to be understood that the present invention is by no means limited thereto but encompasses all changes and modifications that will become possible within the scope of the appended claims.

What is claimed is:

1. A color wheel comprising:
   a plurality of sectorial color filter segments, each color filter segment having at least one segment fixing mechanism constituted by one of a through-hole and a cavity; and
   a support member having a plurality of protrusions disposed at an outer peripheral portion thereof, the protrusions each has a cavity defined therein, the protrusions being fitted in respective segment fixing mechanisms of the color filter segments thereby fixedly setting the color filter segments to the support member in a disk-like arrangement,
   wherein the support member is formed by press-molding so as to integrally include the protrusions.

2. A color wheel according to claim 1, wherein one surface of the support member is in contact with a motor hub.

3. A color wheel according to claim 1, wherein one surface of the color filter segments are in contact with a motor hub.

4. A color wheel according to claim 1, wherein the cavity provided within each of the protrusions is a complete through-hole.

5. A manufacturing method of a color wheel comprising a plurality of sectorial color filter segments, and a support member, the method comprising the steps of:
   providing a plurality of protrusions at a protrusion fitting mechanism located at an outer peripheral portion of the support member in such a manner that each of the protrusions has a cavity therein;
   forming, at each of the color filter segments, at least one segment fixing mechanism which is constituted by one of a through-hole and a cavity; and
   fitting the protrusions in respective segment fixing mechanisms of the color filter segments thereby fixedly setting the color filter segments to the support member in a disk-like arrangement,
   wherein the support member is formed by press-molding so as to integrally include the protrusions.

6. A manufacturing method according to claim 5, wherein one surface of the support member is in contact with a motor hub.

7. A manufacturing method according to claim 5, wherein one surface of the color filter segments are in contact with a motor hub.

* * * * *